United States Patent [19]

Kaiser et al.

[11] 4,000,693
[45] Jan. 4, 1977

[54] SAFE ACCESS ARRANGEMENT FOR DRIVEN MECHANISMS IN A PRINTING PRESS

[75] Inventors: Werner Kaiser, Offenbach-Rumpenheim; Paul Abendroth, Offenbach (Main), both of Germany

[73] Assignee: Roland Offsetmaschinenfabrik Faber & Schleicher AG, Germany

[22] Filed: June 23, 1975

[21] Appl. No.: 589,009

[30] Foreign Application Priority Data

June 26, 1974 Germany .................... 2430536

[52] U.S. Cl. .............................. 101/183; 101/217; 200/50 A
[51] Int. Cl.² ......................................... B41F 33/12
[58] Field of Search .......... 200/50 A, 50 AA, 50 C; 101/181, 180, 183, 184, 247

[56] References Cited

UNITED STATES PATENTS

| | | | |
|---|---|---|---|
| 3,141,074 | 7/1964 | Rexroad | 200/50 A |
| 3,534,186 | 10/1970 | Meyer | 200/50 A |
| 3,691,329 | 9/1972 | Ball | 200/50 A |
| 3,828,673 | 8/1974 | Gazzola et al. | 101/232 |

FOREIGN PATENTS OR APPLICATIONS

88,943   4/1972   Germany

*Primary Examiner*—Edgar S. Burr
*Assistant Examiner*—Paul J. Hirsch
*Attorney, Agent, or Firm*—Leydig, Voit, Osann, Mayer & Holt, Ltd.

[57] ABSTRACT

A safe access arrangement for a printing press having remotely located driven mechanisms normally enclosed by guards or covers and which are removable to provide access for observation, adjustment or servicing. Remote control modules are located under the respective access covers each module having a motor remote control switch and a shiftable interlock switch, the shiftable switch being automatically thrown from a normal position to a shifted position when the access cover is removed. Each shiftable switch includes a first contact for disabling the main switch of the press and a second contact for activating, or "enabling", operation of the associated motor remote control switch so that the motor may only be turned on by the remote control switch at the location of the open cover. Each shiftable switch includes interlock contacts paired with corresponding contacts in each of the other remote control modules to control a disabling circuit so that the motor is totally disabled when two or more covers are open simultaneously, thereby to prevent someone at a second opened cover from starting the motor and causing injury to the press operator, or damage to the mechanism, at a first opened cover.

10 Claims, 5 Drawing Figures

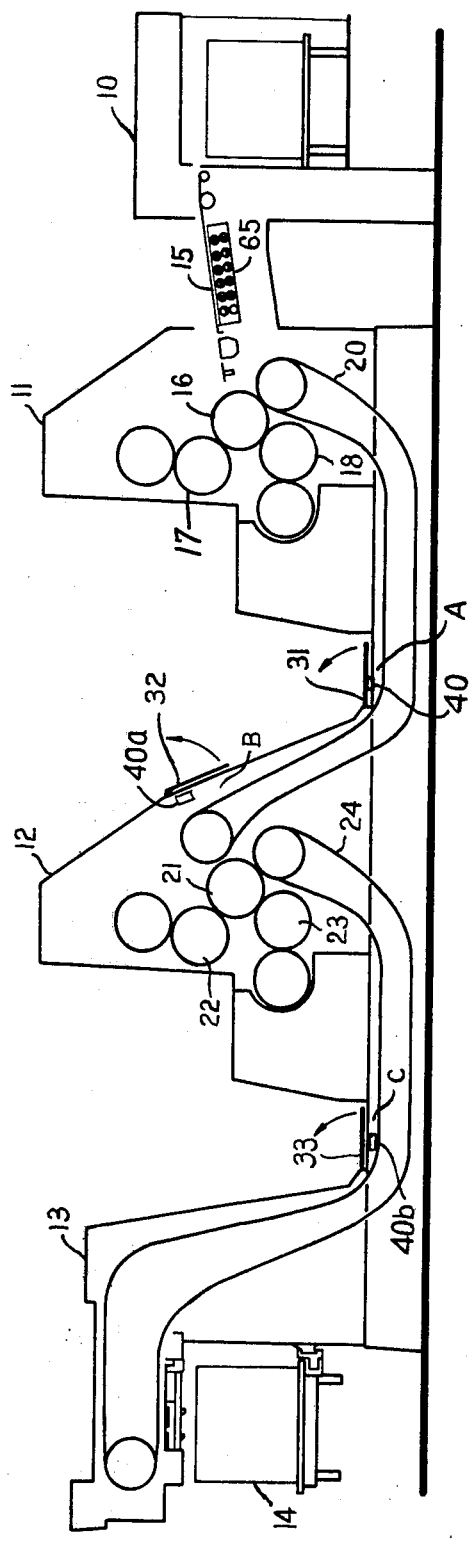
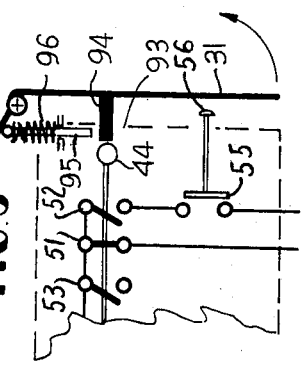
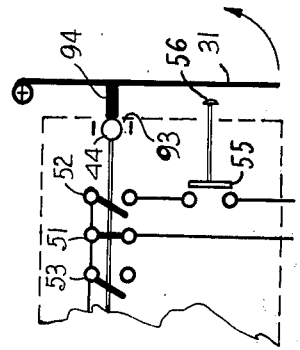
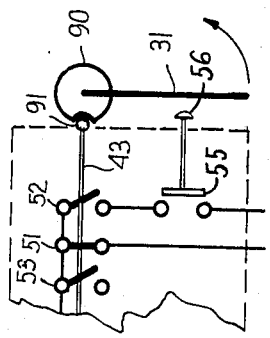

SAFE ACCESS ARRANGEMENT FOR DRIVEN MECHANISMS IN A PRINTING PRESS

In a printing press consisting of a number of press units there are various cylinders and mechanisms which are located remotely from a central control console and which require inspection and adjustment or servicing from time to time. It has been common practice to provide protective guards or covers for normally covering such mechanisms as well as means for switching off the press drive whenever the hand of the operator gets into a danger zone. However, the problem is that many mechanisms require observation or adjustment while the press is running, which suggests the possibility of providing a remote control switch at each of the points of inspection or adjustment for energization of the drive motor. However, where a plurality of remote control switches are provided there is always the possibility that a second press operator, or unauthorized individual, may inadvertently energize the drive motor at a second remote location, or at the main console, to cause injury to a first press operator who is making an adjustment.

It is, accordingly, an object of the invention to provide a safety arrangement for a printing press having a number of remotely located driven mechanisms with removable guards or covers in which removal of a cover serves (a) to disable the main switch for the press drive motor and (b) to activate, or "enable", the motor remote control switch at the location of the open cover so that the operator who has removed the cover is exclusively in control of the driven motor, enabling him to perform his adjustment or observation with the mechanism in motion.

It is another object of the present invention to provide a safety system of the above type in which removal of a second cover, at a second remote location, concurrently with the first, serves to completely disable or silence the press drive motor, making it impossible to drive the press until the second cover has again been closed thereby to restore the operation of the press to a single operator at a single remote location.

It is another object of the present invention to provide means for safe remote operation of a printing press from a number of remote locations for purposes of inspection or adjustment at such locations and in which the operator at one of the locations has complete assurance that he has total and exclusive remote control of the press drive motor so that he cannot possible be placed in a condition of hazard by some other operator or by a third person when adjustment or inspection is made with the press in motion.

It is still another object of the invention to provide a safe remote control and interlock system for a printing press which employs remote control modules which are of standardized construction and in the form of a totally enclosed, easily mounted unit. It is a related object to provide a safety system for a printing press having a number of remotely located driven mechanisms, which is capable of protecting an operator at any and all of the locations and which is readily expandable to provide full protection at any additional locations thereby to provide complete protection for an extensive press installation including a large number of printing units.

It is a more detailed object of the present invention to provide a safe remote control system employing totally housed transmitter units at a plurality of remote locations which are automatically operated by protective guards or covers at the respective locations and which are so constructed as to prevent the operator from defeating the protective purpose of the device by simulating actuation by a guard or cover, even though the guard or cover is not in fact in place.

It is a general object of the invention to provide a safe remote control system for a printing press which is inexpensive to construct and install, being formed of a plurality of standardized transmitter units of simple construction, which is foolproof in operation, insuring safety without any particular care or attention on the part of the operator, and which is capable of operating safely over long periods of time without maintenance.

Other objects and advantages of the invention will become apparent upon reading the attached detailed description and upon reference to the drawings in which:

FIG. 1 shows a four color offset press having three remotely located covers or guards equipped with protective means constructed in accordance with the present invention.

FIG. 3 is a fragmentary diagram showing actuation of a shiftable switch in a typical module by means of a cam and cam follower operated by hinging movement of the cover from closed position.

FIG. 4 is a fragmentary diagram of a module showing the recessing of the switch actuator and the engagement thereof by a probe secured to the cover or guard.

FIG. 5 is a fragmentary diagram of a transmitter module in which the switch actuator is not only recessed, as in FIG. 4, but in which a shutter is employed to prevent manipulation when the cover or guard is in open condition.

Figure 2:
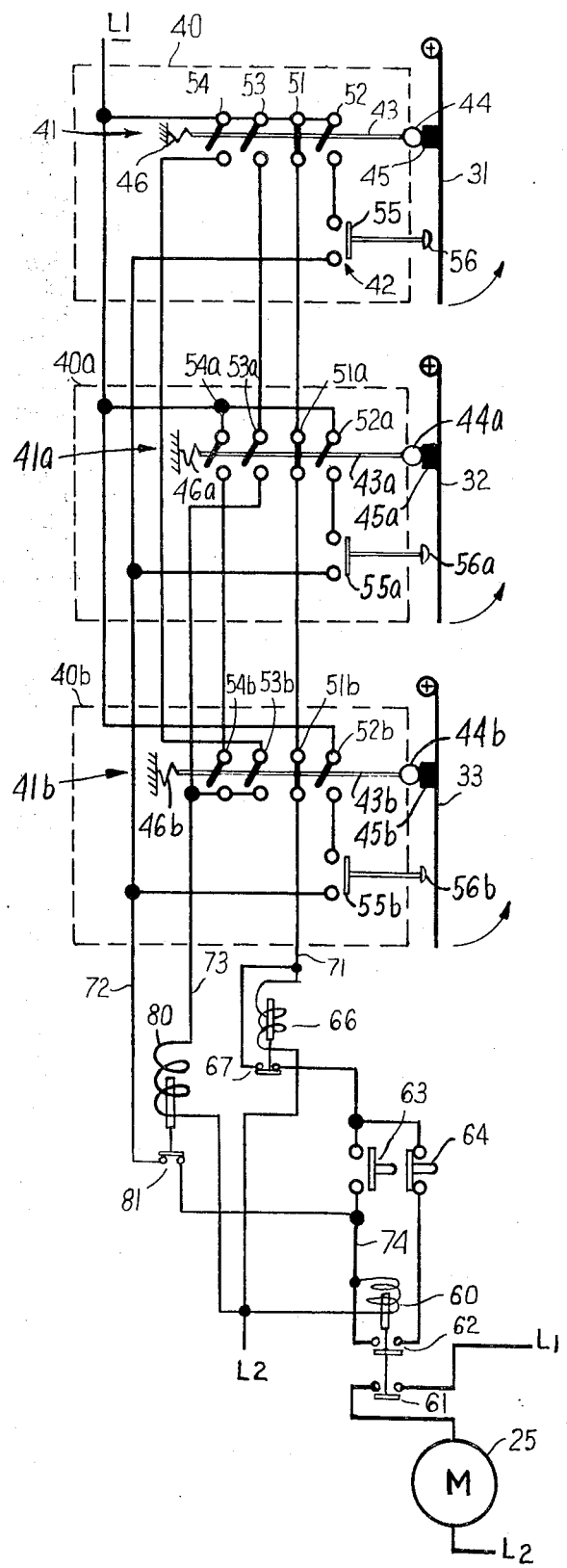
FIG. 2 is a schematic diagram showing use of three remote control modules at the respective remote locations and the means for coupling such modules to one another and to the press drive motor.

While the invention has been described in connection with certain preferred embodiments, it will be understood that we do not intend to limit the invention to the particular embodiments shown but intend, on the contrary, to cover the various alternative and equivalent constructions included within the spirit and scope of the appended claims.

Referring now to FIG. 1 of the drawings, there is shown an offset printing press including a feeder 10 followed by printing units 11, 12, with the printed sheets being fed to a delivery unit 13 where sheets are stacked upon a pile 14. A sheet fed from the feeder 10, across a feed table 15, is taken by an impression cylinder 16 (means not shown) having cooperating blanket cylinders 17, 18 for the printing of one side of the sheet in two colors. The sheet is then transferred to a chain conveyor 20 where it is gripped for transport to an impression cylinder 21 (means not shown) in the next press unit, the impression cylinder having associated blanket cylinders 22, 23 for applying two additional color impressions, making a total of four. The sheet is then transferred to a second conveyor 24 which leads to the delivery unit 13. It will be understood, in accordance with usual practice, that a drive motor diagrammatically indicated at 25 is coupled to all of the cylinders and conveyors for simultaneous operation of all of the mechanisms which go to make up the total press.

In the operation of a press of this kind, consisting of a number of units, various cylinders and mechanisms must be inspected and adjusted so that all portions of the press are precisely coordinated to produce high quality printing. This includes adjustment of register of the printed impressions and timed adjustment of the various mechanisms which engage and transport the sheet. Typical "regions of remote adjustment" have been indicated at A, B, and C in FIG. 1. Such regions are normally enclosed by guards or covers which may, for example, be hinged in place and which are indicated at 31, 32, 33, respectively. It will be understood as the discussion proceeds that while the invention has been described in connection with three remotely located guards or covers, the invention is not limited thereto and may be extended to any desired number in accordance with the requirements of the press.

Located within, and protected by, the cover 31 is a transmitter module 40 (FIG. 2). Similar modules 40a, 40b are employed at the two other locations in association with guards or covers 32, 33, and the same reference numerals have been employed to designate similar parts, with addition of subscripts a and b, respectively. Each of the modules is compactly contained in a housing indicated by the dotted enclosing lines.

Referring more specifically to the remote control or trasmitter module 40, it includes two switches, a first "shiftable" gang switch 41 and a motor remote control switch, or push button, 42. The shiftable switch has a shiftable member 43 having an actuator 44 which is engaged by a pad or plunger 45 which is mounted upon the cover 31 and which causes the switch 41 to be thrown from the illustrated normal position, with the cover closed, to a shifted position, under the influence of a biasing spring 46, when the cover is open for inspection or adjustment of the remote mechanism. Mounted upon the shiftable member of the switch is a first, normally-closed, contact 51, a second, normally-open, contact 52 and third and fourth "interlock" contacts 53, 54. The remote control switch 42 has a normally-open remote control contact 55 and an actuator in the form of a manual push button 56.

Prior to describing the manner in which the switches are interconnected, attention may be given to the main motor control circuit. The motor, indicated at 25, is energized by a contactor 60 having a first normally-open load contact 61 which is in series with the motor and a second normally-open contact 62 which serves as a holding or sealing contact. Connected in series with the relay winding is a "start" push button switch 63 having an associated "stop" push button switch 64. The "stop" switch is normally closed and connected in series with the contactor and its holding contact. Both push button switches are located at the regular control console of the press which may, for example, occupy the position 65 (FIG. 1).

For the purpose of furnishing current to the main switch 63 which energizes the contactor 60, a relay 66 is provided having a normally-open contact 67. While the contact 67 has been referred to as "normally-open", it will be seen that during the normal operation of the press the relay 66 is energized, so that the contact 67 is in closed condition, causing the motor control circuit to be normally supplied with voltage from line L1 via a first disabling line 71. Conversely, deenergization of the line 71, and dropping out of the relay 66, removes voltage from both the main "start" switch 63 and "stop" switch 64 and thus serves to disable the regular motor control.

In accordance with the present invention a first, normally-closed, contact is provided in each of the modules, such contacts being connected in series with one another for normally energizing the line 71. Thus it will be seen that the contacts 51, 51a and 51b in the three modules are connected in series so that, when all of the covers 31–33 are closed, the main switch 63 is operative in the normal way, but when any one of the covers 31–33 is removed, the corresponding switch 51 is opened thereby deenergizing th line 71 and dropping out relay 66. If the press motor, at the time of drop-out, is not running, the main switch 63 will be powerless to start it, and if the motor 25 is running, by reason of the engagement of the holding or sealing contact 62, the contactor 60, deprived of holding current, will drop out to stop the motor.

Further in accordance with the invention, means are provided for activating or "enabling" the remote control switch 42 so that the latter is effective to directly energize the motor contactor 60, for jogging control, thereby bypassing the disabled main control switch for exclusive remote control of the motor. For this purpose the remote control switch 42 is connected to a remote control bus 72 which provides voltage to a point 74 at one end of the contactor 60. Thus, with cover 31 open, the operator may press the remote control push button 56 to provide jogging control of the contactor 60 and motor 25, the holding contact 62 being ineffective to keep the motor running.

In accordance with a further aspect of the invention, interlock contacts are provided on the shiftable interlock switch 41 which are connected in paired relation with corresponding contacts on each of the other ones of the shiftable switches to complete a circuit to a motor disabling line 73. The latter controls a motor disabling relay 80 having a normally-closed contact 81. Such contact is connected in series with the remote control bus 72 to prevent voltage from being applied to the control bus, for operation of the motor, whenever two or more of the covers have been opened. It will be apparent that when two of the covers are open there is risk that two separate individuals, authorized or not, may attempt simultaneously to control the drive motor and it is further conceivable that the second individual may turn the motor on at an inopportune time resulting in injury to the first individual or to the press equipment. By pairing of the contacts of the separate transmitters and by causing the paired contacts to energize the disabling line 73, opening of any two of the covers results in energization of the relay 80 and the opening of the disabling relay contacts.

Thus referring to the circuit diagram in FIG. 2, the normally open contact 53 in the remote control module 40 is connected in series with normally-open contact 53a in module 40a. As a result, opening covers 31, 32 simultaneously energizes disabling line 73 for disablement of the motor. Similarly, normally-open contact 54 in module 40 is connected in series with normally-open contact 53b in module 40b, so that when covers 31, 33 are both open, the disabling line 73 will also be energized. Finally, normally-open contact 54a in module 40a is connected in series with normally-open contact 54b in module 40b so that the motor is disabled when covers 32, 33 are both open.

To summarize, opening any one of the covers serves to disable the main motor switch 63 and to activate, or enable, the remote control switch at the open cover for remote control of the drive motor so that the pressman may make his observation or adjustment with the press running under his "jogging" control. However, in the event that someone should open a second one of the covers while the first is still open, the paired normally-open contacts associated with the respective covers complete a circuit to the disabling line 73, causing energization of the motor-disabling relay 80, to open, that is, disable, the remote control bus 72.

Thus when a pressman is working on the press and has one of the protective covers open he is secure in the knowledge that no one can start the press, either by operating the main control switch 63 or by pressing a remote control switch at one of the other protected locations.

In accordance with one of the aspects of the present invention, means are provided in each of the modules for preventing a press operator from manipulating the shiftable switch to simulate the presence of the protective cover and thus defeat the above-described safety feature. Thus as shown in FIG. 3, which shows a portion of the module 40, a cam 90 is provided which is rotatable with the cover about its hinge axis, the cam being engaged by a cam follower 91 which forms the actuating element of the shiftable switch. In this embodiment the individual switch contacts are oppositely "faced" from those earlier described so that inward, rather than outward, movement of the shiftable member 43 of the switch occurs when the cover is swung to open position about the hinge axis.

It is a further feature of the invention that the actuator for the shiftable switch may be recessed within the housing yet engageable by a probe secured to the cover and projecting through an opening in the housing. Thus referring to FIG. 4 the actuator 44 is in a position recessed below the surface of housing but alined with a registering opening 93. Secured to the protective cover 31 is a probe 94 which is alined with the opening 93 so that, when the cover is swung closed about its hinge axis, the plunger 94 extends through the opening 93 to actuate the switch.

Further in accordance with the invention, a shutter may be provided for closing the opening 93 when the cover 31 is open. Such shutter may be in the form of a slide 95 having a spring 96 and connected to an arm 97 which swings in unison with the cover 31, about the hinge axis. Thus, referring to FIG. 5, when the cover 31 is swung to open position the plunger 94 releases the actuator 44 causing outward shifting movement of the switch. At the same time the slide 95 covers the opening 93 in front of the actuator 44 so the actuator is not accessible for manipulation.

After the pressman has performed his adjustment or operation, and closes the cover 31, normal control of the press is reestablished. That is, contact 51 is restored to its normally closed condition to complete a circuit via line 71 to the relay 66 so that the main or "start" push button 63 becomes again effective to energize the contactor 60 to close the motor circuit following which the circuit is held in until intentionally deenergized by the "stop" button. It will be apparent that the objects of the invention have been amply fulfilled. The transmitter modules employed in the various protected locations are substantially identical to one another and therefore may be manufactured inexpensively on a production basis. Since each module is enclosed in, and protected by, a housing, mounting at each location is an easy matter. The pressman can make an adjustment or inspection at any of the protected locations by the simple expedient of opening the guard or cover which throws a switch to establish all of the necessary circuitry to insure complete safety and to enable remote control jogging operation of the drive motor so that the mechanism may be observed or adjusted under actual running conditions without need for additional personnel. Moreover, any inadvertent opening of an additional cover or guard immediately and totally silences the drive motor, and the press cannot be driven until the spurious cover has been reclosed.

In the event that a press has only one location from which remote operation is desired, it will be apparent that a single remote transmitter module will suffice, with contact 51 driving line 71 for disabling the regular start-stop (holding) control and contact 52 energizing line 72 for direct jogging operation of the motor contactor 60.

While the invention has been described in connection with electromechanical relays, it will be understood that the term "relay" as used herein is a general term to cover a device having an output circuit which is made or broken by energizing an input circuit. Thus the invention contemplates use of "relays" of the solid state type.

The term "shiftable" has been used in connection with the switches 41, and a switch having a reciprocated actuator is, indeed, preferred. However, it will be understood that the term "shiftable" is intended to be a general term and includes rotational as well as reciprocating movement. Also while the term "switch" has been used in the singular to describe the preferred embodiment in which a gang switch is used having a series of contacts 51–54, it will be understood that the invention is not necessarily limited to use of a gang switch and, if desired, separate simultaneously-actuated switches may be employed, of either the normally-closed or normally-open type as appropriate, at each location to achieve the described switching of the contacts. The term module is therefore to be interpreted as a "set" of switches for carrying out the intended functions.

The invention has been described in connection with a shiftable switch having a total of four ganged contacts. Two of the contacts, indeed, are necessary for three protected remote stations. To permit the possibility of expansion in the number of stations, additional "idle" normally-open contacts may be provided in the modules to accommodate any foreseeable number of interconnected remote control positions.

What is claimed is:

1. In a printing press having a drive motor and remotely located driven mechanisms as well as a main switch for the drive motor, the combination comprising access covers for safely covering the driven mechanisms but removable to provide access for servicing and adjustment, remote control modules located under the respective access covers, each remote control module having a motor remote control switch including an enabling circuit exclusive of said main switch and effective to energize the drive motor, each remote control module further having a shiftable interlock switch, said interlock switch being mechanically coupled to the associated access cover for movement from a normal position when the cover is closed to a shifted position when the cover is open, means including a motor disabling relay having a normally closed contact effectively connected in series with the motor so the motor is disabled when the relay is energized, the interlock switches each including first and second contact means for shifting control of said motor from said main switch to said means including said motor disabling relay when a single cover is open, said first contact means effectively in series with the main switch for disabling the main switch when the associated cover is open, said second contact means connected to the associated motor remote control switch for enabling the latter when the associated cover is open, said interlock switches further including contacts connected in paired relation with corresponding contacts on each of the other ones of the interlock switches for energizing the motor disabling relay so that the motor is disabled whenever two or more covers are open simultaneously.

2. In a printing press having a drive motor and remotely located driven mechanisms as well as a main switch for the drive motor, the combination comprising access covers for safely covering the driven mechanisms but removable to provide access for servicing and adjustment, remote control modules loated under the respective access covers, each remote control module having a motor remote control switch for energizing the drive motor and having a shiftable interlock switch, the interlock switch being mechanically coupled to the associated access cover for movement from a normal position when the cover is closed to a shifted position when the cover is open, first circuit means including a relay having its output connected to disable the main switch, second circuit means including a relay having its output connected to disable the motor, the interlock switches each including first and second contact means for shifting control of said motor said first circuit means to said second circuit means when a single cover is open, said first contact connected to the first relay for disabling the main switch when the associated cover is open, said second contact connected to the associated motor remote control switch for enabling the latter when the associated cover is open, said interlock switches further including contacts connected in paired relation with corresponding contacts on each of the other ones of the interlock switches for operating the second relay so that the motor is disabled when ever two or more covers are open simultaneously.

3. In a printing press having a drive motor and remotely located driven mechanisms as well as a main switch for the drive motor, the combination comprising access covers for safely covering the driven mechanisms but removable to provide access for servicing and adjustment, remote control modules located under the respective access covers, each remote control module having a motor remote control switch for energizing the drive motor and having a shiftable interlock switch, said interlock switch being mechanically coupled to the associated access cover for movement from a normal position when the cover is closed to a shifted position when the cover is open, means including first circuit means for selectively enabling and disabling the main switch, means including second circuit means for selectively enabling and disabling the motor, the interlock switches each including contact means for shifting control of said motor from said first circuit means to said second circuit means when a single cover is open, and further including means comprising contacts connected in paired relation with corresponding contacts on each of the other ones of the interlock switches and connected to the second circuit means so that the motor is disabled whenever two or more covers are open simultaneously.

4. The combination as claimed in claim 3 in which each of the modules is totally enclosed in a housing fixedly mounted with respect to the cover, each interlock switch having an actuator engageable by the cover and the motor remote control switch having an actuator which is normally shielded by the cover and which becomes accessible for manual operation when the cover is removed.

5. The combination as claimed in claim 2 in which the first relay has a normally open contact and in which the first contacts of each of the interlock switches are normally closed and are all connected in series with the first relay so that the breaking of the circuit by opening of any one of the covers serves to prevent the main switch from energizing the drive motor, the second contact on each of the interlock switches being normally open and connected in series with the associated motor remote control switch so that the closing of the circuit upon removing the cover enables the associated motor remote control switch for remote operation from the location of the open cover.

6. The combination as claimed in claim 2 in which the second relay has a normally closed contact and in which the paired interlock contacts on the shiftable interlock switches are connected in series with the second relay so that the second relay is energized whenever two or more covers are open simultaneously accompanied by the opening of the normally closed contact on the second relay thereby to open the motor circuit for disablement of the motor until such time as one of the covers may be closed.

7. In a printing press having a drive motor and remotely located driven mechanisms as well as a main switch for the drive motor, the combination comprising access covers for safely covering the driven mechanisms but removable to provide access for servicing and adjustment, remote control modules located under the respective access covers, each remote control module having a motor remote control switch including an enabling circuit for energizing the drive motor, each remote control module further having a shiftable interlock switch, said interlock switch being coupled to the associated access cover for movement from a normal position when the cover is closed to a shifted position when the cover is open, means including a first relay having a normally open contact effectively connected in series with the main switch, means including a second relay having a normally closed contact effectively in series with the motor, the shiftable interlock switches each including (a) a normally closed contact with such contacts being connected in series with one another and with the first relay so that the first relay is deenergized upon opening of any of the covers thereby to disable the main switch for shutting off of the motor and (b) a normally open contact connected in series with the associated motor remote control switch for enabling such switch to energize the motor from the location of the open cover and (c) interlock contacts connected in paired relation with corresponding contacts on each of the other ones of the interlock switches and connected to the second relay so that the second relay is energized for disablement of the motor when any two of the covers are open simultaneously, the disablement being effective until one of the open covers is closed.

8. The combination as claimed in claim 3 in which each module is totally enclosed in a housing and in which the shiftable interlock switch and motor remote control switch have actuators projecting through the housing, the cover having a hinge connection, and a cam and cam follower interposed between the hinge connection and the actuator for the interlock switch for operating the interlock switch and precluding manipulation of the interlock switch to its normal position when the cover is open.

9. The combination as claimed in claim 3 in which each module is totally enclosed in a housing and in which actuators for the shiftable interlock switch and motor remote control switch are accessible through the wall of the housing, the actuator for the interlock switch being recessed with respect to the housing and the cover having an inwardly projecting probe rigidly secured thereto registered with such actuator and for engaging and depressing such actuator when the cover is closed.

10. The combination as claimed in claim 3 in which each module is totally enclosed within a housing, the shiftable interlock switch having an actuator recessed within the housing and the housing having an aperture alined with the actuator, a probe on the cover for registering with and engaging such actuator when the cover is closed for holding the switch in normal position, a shutter for covering the aperture, and means for coupling the shutter to the cover so that when the cover is removed the shutter moves into blocking position with respect to the actuator thereby to preclude manipulation of the actuator.

* * * * *